(12) United States Patent
Esposito et al.

(10) Patent No.: US 11,734,978 B2
(45) Date of Patent: Aug. 22, 2023

(54) FRICTIONLESS ACCESS CONTROL SYSTEM WITH RANGING CAMERA

(71) Applicant: Sensormatic Electronics, LLC, Boca Raton, FL (US)

(72) Inventors: Robert Esposito, Westford, MA (US); James Trani, Albuquerque, NM (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 15/729,929

(22) Filed: Oct. 11, 2017

(65) Prior Publication Data

US 2018/0102005 A1    Apr. 12, 2018

Related U.S. Application Data

(60) Provisional application No. 62/406,731, filed on Oct. 11, 2016.

(51) Int. Cl.
| | |
|---|---|
| *G07C 9/25* | (2020.01) |
| *G01C 3/02* | (2006.01) |
| *G06F 3/01* | (2006.01) |
| *G07C 9/00* | (2020.01) |
| *G07C 9/28* | (2020.01) |
| *G06V 20/52* | (2022.01) |
| *G06V 20/64* | (2022.01) |
| *G06V 40/10* | (2022.01) |

(52) U.S. Cl.
CPC ............... *G07C 9/257* (2020.01); *G01C 3/02* (2013.01); *G06F 3/017* (2013.01); *G06V 20/52* (2022.01); *G06V 20/64* (2022.01); *G06V 40/103* (2022.01); *G07C 9/00571* (2013.01); *G07C 9/28* (2020.01)

(58) Field of Classification Search
None
See application file for complete search history.

(56) References Cited

U.S. PATENT DOCUMENTS

| | | | |
|---|---|---|---|
| 2010/0124357 A1* | 5/2010 | Hampapur | G06K 9/00778 382/103 |
| 2014/0152763 A1* | 6/2014 | Lim | G06K 9/00778 348/36 |
| 2016/0308859 A1* | 10/2016 | Barry | G06K 9/2036 |

\* cited by examiner

*Primary Examiner* — Daniel T Tekle
(74) *Attorney, Agent, or Firm* — ArentFox Schiff LLP (57) ABSTRACT

An access control and user tracking system includes ranging cameras installed in thresholds of access points for generating three dimensional models of users passing through the access points in order to detect unauthorized individuals or hand gestures of the users, which can indicate unsafe conditions or that lights and/or equipment should be turned on. The ranging cameras can be point range finding measurement sensor scanning cameras, structured light cameras, or time of flight cameras and can be installed along the top or in the corners of the thresholds.

26 Claims, 8 Drawing Sheets

FRICTIONLESS ACCESS CONTROL SYSTEM WITH RANGING CAMERA

RELATED APPLICATIONS

This application claims the benefit under 35 USC 119(e) of U.S. Provisional Application No. 62/406,731, filed on Oct. 11, 2016, which is incorporated herein by reference in its entirety.

BACKGROUND OF THE INVENTION

Security systems are often installed within and around buildings such as commercial, residential, or governmental buildings. Examples of these buildings include offices, hospitals, warehouses, schools or universities, shopping malls, government offices, and casinos. The security systems typically include components such as system controllers, access control readers, video surveillance cameras, network video recorders (NVRs), and door controllers, to list a few examples.

The access control readers are often installed at access points of the buildings to control access to restricted areas, such as buildings or areas of the buildings. Examples of access points include front and interior doors of a building, elevators, hallways connecting two areas of a building, to list a few examples. The access control readers authenticate identities of (or authorize) individuals and then permit those authenticated individuals to access the restricted areas through the access points. Typically, individuals interact with the access control readers by swiping keycards or bringing contactless smart cards within range (approximately 2-3 inches or 5 centimeters) of a reader. The access control readers read the information of the keycards and then the access control systems determine if the individuals are authorized to access the restricted areas. If the individuals are authorized to enter the restricted areas, then the access control readers allow access to the restricted areas by unlocking locked doors, signaling that doors should be unlocked, activating elevators, or generating alarms upon unauthorized entry, for example.

More recently, frictionless access control and tracking systems have been proposed. These systems use wireless technology that enables a more transparent method for identifying and tracking individuals while providing similar access control as traditional systems and methods. The systems can automatically identify individuals as they approach or stand in threshold areas of the access points. Threshold areas are typically areas within close proximity to the access points, such as entrances of the restricted areas and/or areas in front of doors, in examples. These systems accomplish these tasks without requiring the individuals to swipe or wave keycards, for example, at card readers, and can more continuously track those users in and around buildings.

In these systems, users carry active wireless devices on their person. These user devices transmit user information, such as credentials, that identify the users to a wireless receiving device, or positioning unit. In some cases, the user devices are mobile computing devices such as smart phones or tablet computing devices. In other cases, fobs are used.

In one implementation, the positioning units are installed above access points. The positioning units include directional antennas for detecting if a user with a user device is in close proximity to the access point. The positioning units might also include an omni directional antenna for communicating with user devices in the broader vicinity to the access point. When user information is received by the positioning units, the positioning units can then determine locations of the user devices (and thus the locations of the users) by comparing the strength of the signals received by the directional antenna against the signal strength received by the omni directional antenna.

SUMMARY OF THE INVENTION

One issue that arises in access control systems is the problem of tailgating. This occurs when an individual that is not authorized to pass through an access point nevertheless passes through the access point in close physical proximity to an individual that is authorized to pass through the access point.

How tailgating is addressed in frictionless systems is typically more problematic since the system by definition reduces the overt actions required by individuals to interact with the system.

The present system includes a ranging (e.g., structured light and/or time-of-flight) camera installed at access points such as in the threshold of doors. The ranging camera generates a three dimensional model of users passing through the threshold by determining the distance between the top of the threshold and the surface of the user. The model can then be analyzed to determine whether a single person or multiple people are passing through the threshold. If it is determined that an unauthorized user is passing through the threshold, an alarm signal can be generated.

Additionally, the ranging camera can detect hand gestures of users as they pass through the threshold. It is desirable to use gesture recognition to generate signals to communicate with and control broader security and maintenance systems. In one example, a user passing through the threshold makes a hand gesture to indicate that an unsafe condition is present. In another example, the user makes a hand gesture to indicate that the lights or other equipment should be turned on in the secured area being entered. The model generated by the ranging camera is analyzed and either an alarm signal is generated or a signal indicating that the lights or equipment should be turned on is generated, respectively.

In general, according to one aspect, the invention features an access control and user tracking system for a security system. The access control and user tracking system includes ranging camera units for generating three dimensional models of users passing through access points of the access control and user tracking system and a verification and tracking system for analyzing the three dimensional models.

In embodiments, the ranging camera units comprise point range finding measurement sensor scanning cameras, which further comprise multiple sensors or a single sensor that is spun in a circular motion and/or reflected with mirrors. In other cases, the ranging camera units structured light ranging cameras. In still other case, time of flight cameras are used.

The ranging camera units are installed along the top or in the corners of thresholds. The verification and tracking system analyzes the three dimensional models to detect the presence of unauthorized individuals or to detect hand gestures of the users indicating unsafe conditions and/or to turn on lights and/or equipment.

In general, according to another aspect, the invention features a method for controlling access to access points of an access control and user tracking system for a security system. Ranging camera units generate three dimensional models of users passing through the access points, and a verification and tracking system analyzing the three dimensional models.

In general, according to another aspect, the invention features a ranging camera unit of an access control and user tracking system for a security system. An illumination unit emits light, which is reflected off of users passing through an access point of the access control and user tracking system and captured by a lens. An image sensor translates the captured light into image data based on measurements of the time the light takes to leave the illumination unit, reflect off of the users and travel back to the lens. A controller generates a three dimensional model of the users based on the image data.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
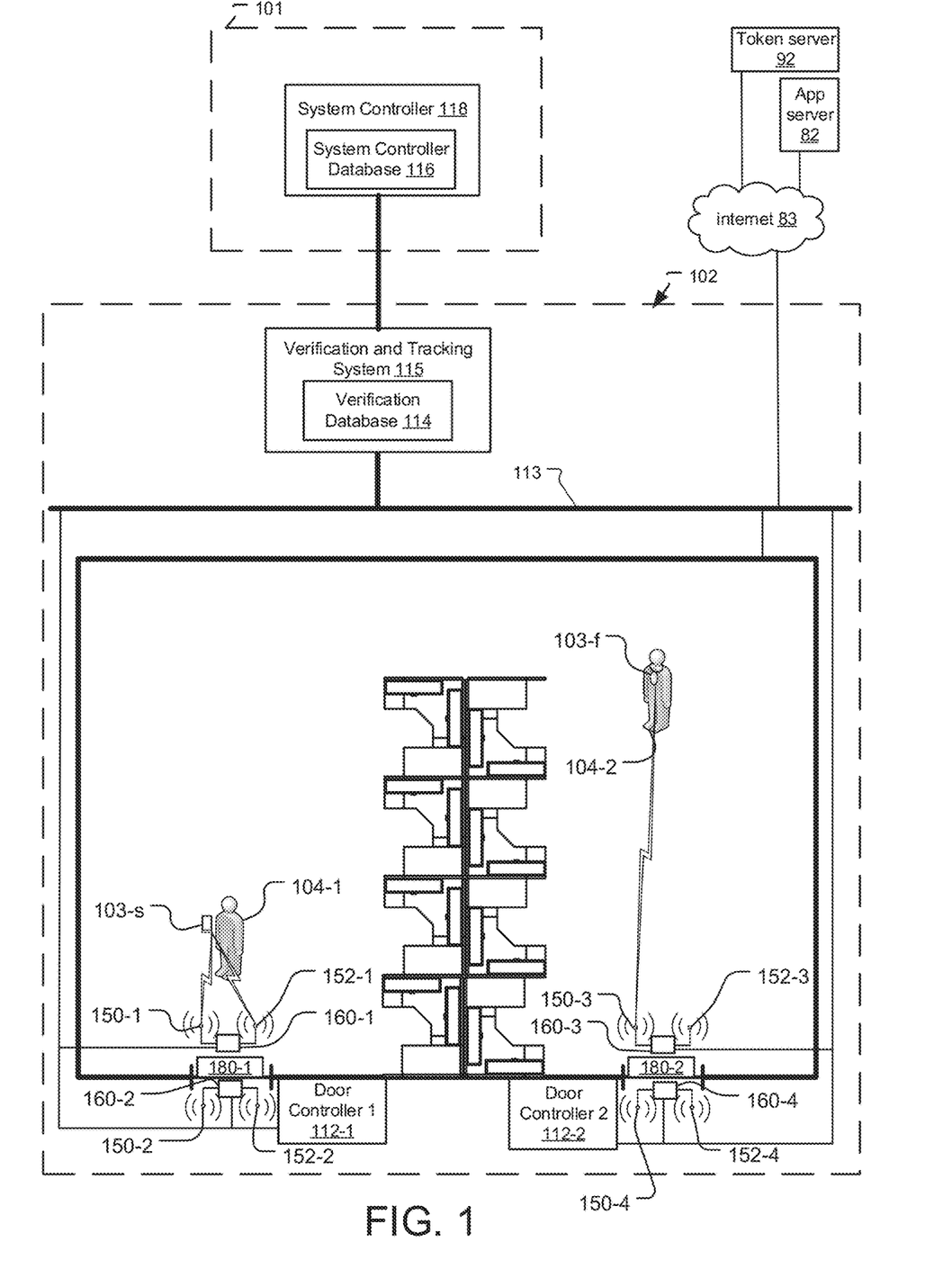
FIG. 1 is a schematic diagram of an exemplary access control system to which the current invention is directed.

FIG. 1 is a schematic diagram of an exemplary access control system 100, which has been constructed according to principles of the present invention.

In operation, the access control system 100 identifies and tracks users 104, determines the locations of users' devices 103 such as smart phones 103-s or ancillary mobile computing devices 103-f such as fobs, enables access through access points to possibly restricted areas of a premises such as a building 102.

In general, the system 100 includes a verification and tracking system 115, positioning units 160, ranging cameras 180, and may further include additional components such as a fingerprint reader kiosk, display devices, and door controllers 112. These components communicate with one another over an enterprise data network 113.

In more detail, in the illustrated example, positioning units 160 are located near access points, such as doors, of the building 102 or areas within the buildings such as door access points that enable users 104 to physically enter or exit the building 102 or access different parts of the building.

In a typical implementation, the users 104 carry their user devices 103, which broadcast packet data. The packet data includes device information for identifying the user device. In one example, the device information for each user device might be a media access control (MAC) address and/or internet protocol (IP) address that has been assigned to the user device or a communication port of the user device. The packet data also typically includes user information for identifying the users. The user information can include a unique user ID for each of the user and/or other information for identifying the user such as a username/password, name of user, department, work extension, personal phone numbers, email addresses, and employee ID number, in examples. In one example, the user information includes a token or a hash of the token generated for the user 104, and the token may or may not expire after a predetermined time.

Users carrying the user devices 103 enroll and/or register the user devices 103 with the system controller 118. When the user device is a smart phone or other mobile computing device, 103-s, the users 104 download a security app, in one example, from the app server 82 to their user device 103-s, where the security app provides access to the system controller 118.

When enrolling a smart phone user device 103-s with a token as the user information, the smart phone user devices 103-s and the system controller 118 might first access a token server 92 to request the token. In response, the token server 92 generates a token, and sends the token or a hash of the token to both the system controller 118 and the user device 103 in response. The token is then included as the user ID within the user information for the user, for both the user information maintained for the user in the system controller 118 and the user information included within the user device 103.

The wireless packet data broadcast from the user devices 103 is preferably secured to prevent unauthorized third parties from intercepting and decoding the packet data during transmission (i.e. during broadcasts). In one example, the packet data is encrypted. In a preferred embodiment, the user devices 103 broadcast the packet data using BLE (Bluetooth low energy) technology.

Bluetooth is a wireless technology that operates in a 2.4 GHz (gigahertz) short-range radio frequency band. In free space, Bluetooth applications typically locate a Bluetooth device by calculating the distance of the user devices 103 from the signal receivers. The distance of the device from the receiver is closely related to the strength of the signal received from the device. A lower power version of standard Bluetooth called Bluetooth Low Energy (BLE), in contrast, consumes between ½ and ¹⁄₁₀₀ the power of classic Bluetooth. BLE is optimized for devices requiring maximum battery life, as compared to the emphasis upon higher data transfer rates associated with classic Bluetooth. BLE has a typical broadcast range of about 100-150 feet (approximately 35-46 meters).

When transmitting via BLE, the user devices 103 might send an AltBeacon compliant BLE broadcast message every second. If the user devices 103 utilize tokens as the user ID, the user devices 103 preferably include a hash representation of the token/user ID in the BLE broadcast messages. In one implementation, the hash representation of the token is a 16-byte, one-way hash of the token, computed using the phone number of the user device 103-$s$ as the seed key and possibly the current time.

In an alternative implementation, the user devices 103 are capable of broadcasting via standard Bluetooth. In still other alternative implementations, the user devices 103 may broadcast via other wireless technologies such as Wi-Fi (IEEE 802.11), active RFID (radio frequency identification), or ZigBee, to list a few examples.

The positioning units 160 each preferably include an omni directional antenna 150 and a directional antenna 152. The packet data are received by antennas 150, 152 of one or more positioning units 160, which determine range and/or direction of the users 104 using one or more positioning techniques.

Positioning units 160 receive the user information for each user and send the user information and the calculated location data to the verification and tracking system 115 via a data network 113. When the user devices 103 utilize tokens, the positioning units 160 might validate the tokens by comparing their own hash representations of the tokens to the representations included in the packet data. The positioning units 160 use the phone number of the user devices 103 or other reference as the seed key for this purpose in some examples. The location data are used by the verification and tracking system 115 to determine motion vectors for and to predict motion intent of the users 104, in examples.

Typically, the data network 113 is an enterprise network such as a Local Area Network (LAN), e.g., wired and/or wireless Ethernet. The positioning units 160 can also communicate with the verification and tracking system 115 via serial connections, in another example.

The verification and tracking system 115 accesses authorization information in a verification database 114, which it maintains or which it only accesses, to determine which users 104 are authorized to access specified restricted areas of a building 102 and/or pass through an access point. Once the users 104 are authenticated by the verification and tracking system 115 and it is determined that those users are authorized to transit the access point, the verification and tracking system 115 sends a door control signal via the network 113 to the door controller 112, in one example. The door controller 112 then enables access to a restricted area by unlocking an access point of the restricted area, such as a door or other portal, thereby providing access for the authorized user 104 to the restricted area while also possibly generating an alarm for an unauthorized user. The door controller 112 preferably unlocks the door when the authorized user 104 is within a threshold area near the access point (e.g., the door or other portal) of the restricted area.

In a typical implementation, the system 100 includes the system controller 118, which includes a system controller database 116. In general, the system controller 118 might store user information for each of the users 104 to the system controller database 116. The system controller database 116 also stores the authorization information 46 for the users 104 (e.g., which users 104 are permitted to access which restricted areas). Periodically, the system controller 118 sends updated user information and authorization information to the verification and tracking system 115 via the network 113. In response, the verification and tracking system 115 saves the received user information and authorization information to its verification database 114.

The verification and tracking system 115 accesses the user information and authorization information within its verification database 114, which acts as a local copy or "cache" of the information. To manage the temporal relevance of the entries in its verification database 114, the verification and tracking system 115 maintains a current time, and applies a time stamp to each item of user information and authorization information received from the system controller 118.

The ranging cameras 180 are structured light, time-of-flight, or point scanning cameras installed at access points such as in the threshold of doors. In general, the ranging cameras generate a range for each pixel or group of pixels in the detected image.

In one embodiment, the ranging camera 180 is a point range finding measurement sensor scanning camera that is installed in the top of the door frame facing toward the bottom of the door frame or outwards at an angle. The scanning camera can be a series of multiple sensors or a single sensor that is spun in a circular motion, or, depending on the sensor type, reflected with a mirror such that it gathers data from numerous points across, or directly in front of the threshold with every pass. As a user 104 passes through the scanning camera's line of sight, data representing distances at each sampling point from the top of the threshold to the surface of the user are recorded along with corresponding temporal data. Using this data, a three dimensional image or model is developed of the user walking through the threshold, including a model of the gesture the user's 104 hand is making.

In other embodiments structured light cameras are used such as a Kinect 3d camera sold by Microsoft Corporation. In still other embodiments, time of flight cameras such as an SR4000 or SR4500 Time-of-Flight (ToF) cameras sold by Mesa Imaging, Ag are used.

The ranging camera 180 sends the model of the user 104 passing through the threshold to the verification and tracking system 115, which analyzes the data and determines whether an unauthorized user 104-T is passing through the threshold, or whether the user 104 is displaying a hand gesture.

In the illustrated example, a floor plan shows two doors, each with two positioning units 160 on either side of the door. One user 104-1 carries a smart phone 103-s that broadcasts user information to a positioning unit 160-1. The second user 104-2 carries a fob 103-f that broadcasts user information to a different positioning unit 160-3. Ranging cameras 180 are installed in the threshold of each door.

Figure 2:
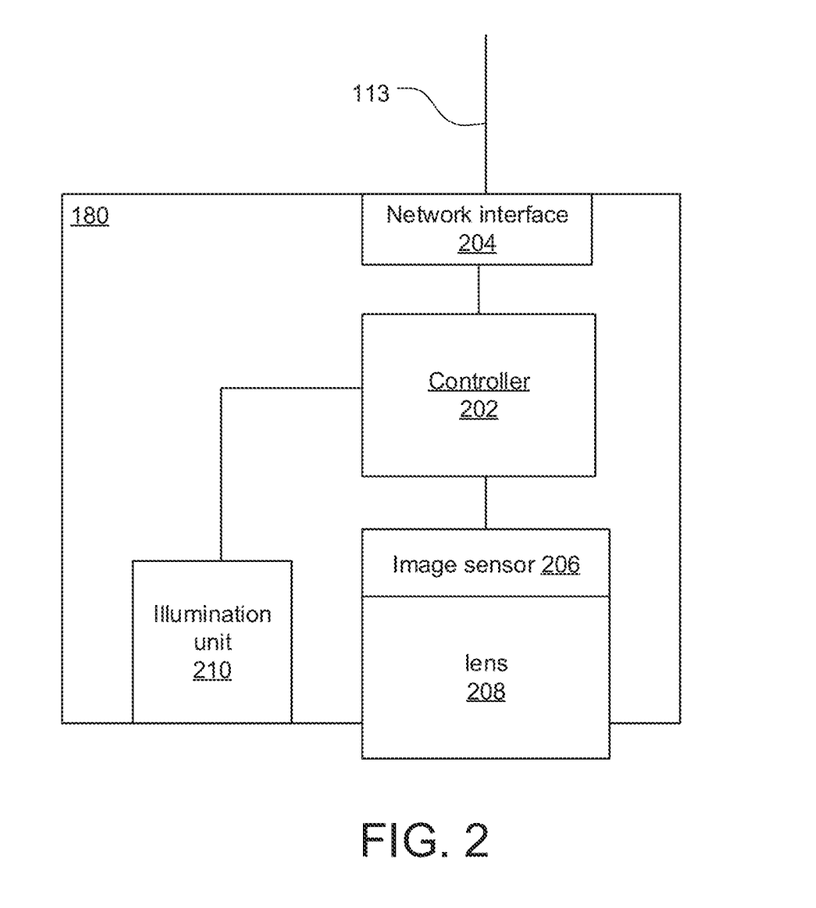
FIG. 2 is a schematic diagram of one embodiment of the ranging camera.

FIG. 2 is a schematic diagram of one embodiment of the ranging camera 180, which includes a controller 202, a network interface 204, an illumination unit 210, an image sensor 206 and a lens 208. The network interface 204 enables connectivity with the network 113 and the rest of the access control system 100. The illumination unit 210 emits light (such as high speed modulated infrared light) which is reflected and captured by the lens 208. The image sensor 206 converts the captured light into image data. The controller 202 measures the time the light takes to leave the illumination unit 210, reflect off of an object such as the user 104, and travel back to the lens 208 and be detected by the image sensor 206. The controller 202 further drives the function of the illumination unit 210, lens 208 and image sensor 206 and sends a three dimensional model of users passing through the threshold to the verification and tracking system 115 via the network interface 204.

Figure 3A:
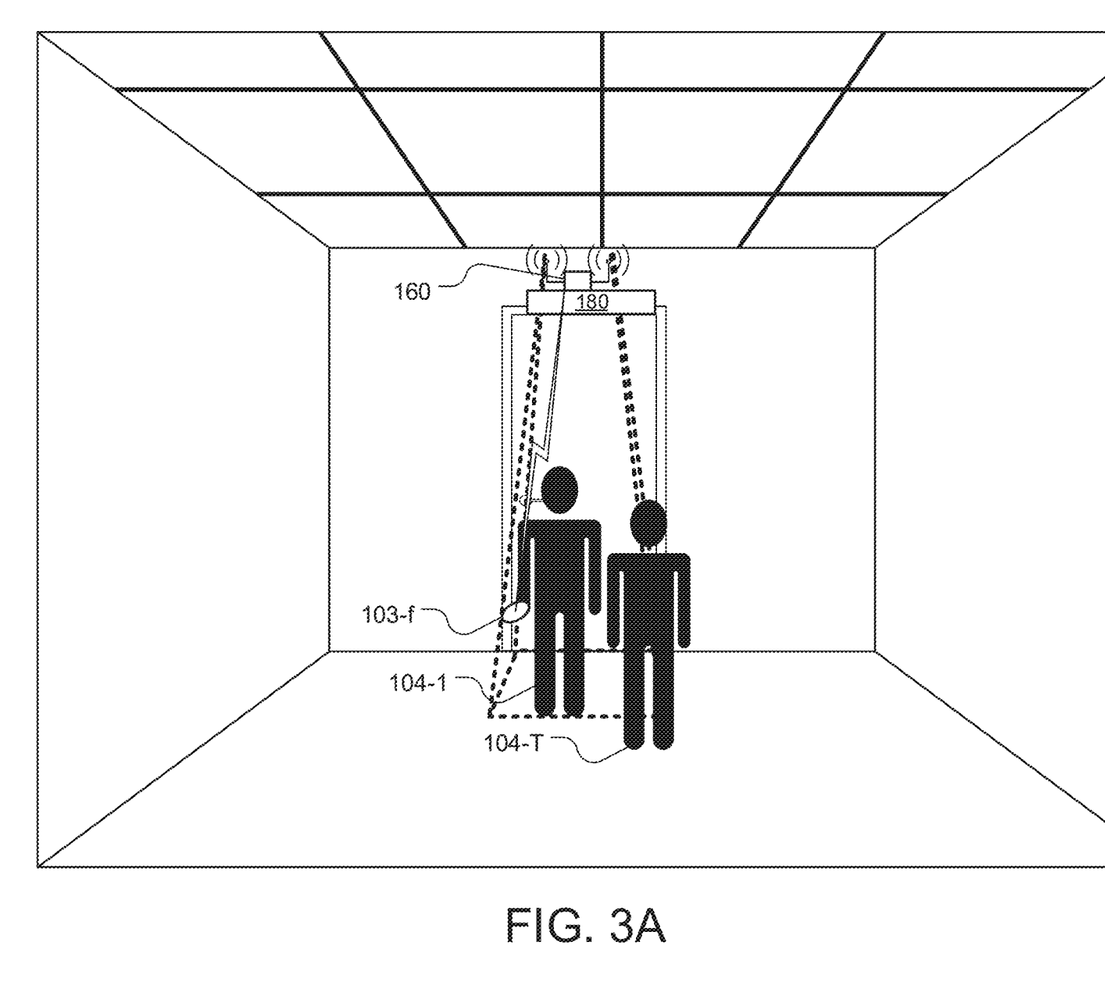
FIG. 3A is a perspective drawing illustrating an example of how the ranging camera of the access control system can be used to detect unauthorized users passing through the access point according to one embodiment.

FIG. 3A is a perspective drawing illustrating an example of how the ranging camera 180 of the access control system 100 can be used to detect unauthorized users 104-T passing through the access point, according to one embodiment. Included is an access point with the ranging camera 180 installed in the threshold of a door. An authorized user 104-1 approaches the threshold with a user device 103-f that is connected to the positioning unit 160. The user 104-1 is followed by an unauthorized user (or tailgater) 104-T. As the two users 104 pass through the threshold, the ranging camera 180 captures a three dimensional image of the users 104 passing through the threshold and sends the data to the verification and tracking system 115, which determines that an unauthorized user 104-T is present. An alarm signal is generated upon detection of the unauthorized user 104-T.

Figure 3B:
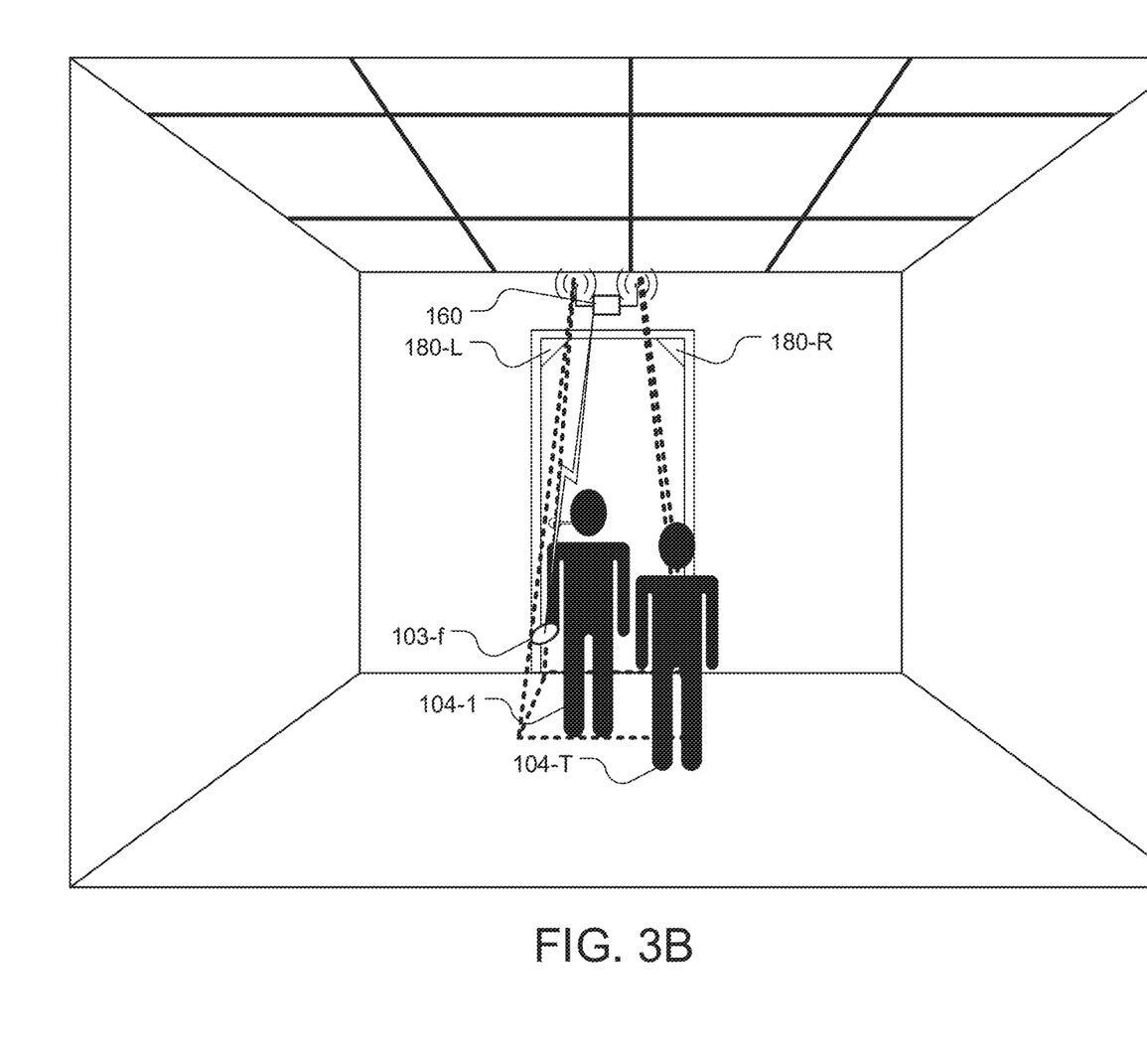
FIG. 3B is a perspective drawing illustrating another example of how the ranging camera of the access control system can be used to detect unauthorized users passing through the access point, according to an alternative embodiment.

FIG. 3B is a perspective drawing illustrating an example of how the ranging camera 180 of the access control system 100 can be used to detect unauthorized users 104-T passing through the access point, according to an alternative embodiment. In this embodiment, there are two ranging cameras 180 installed in each corner of the threshold.

Figure 3C:
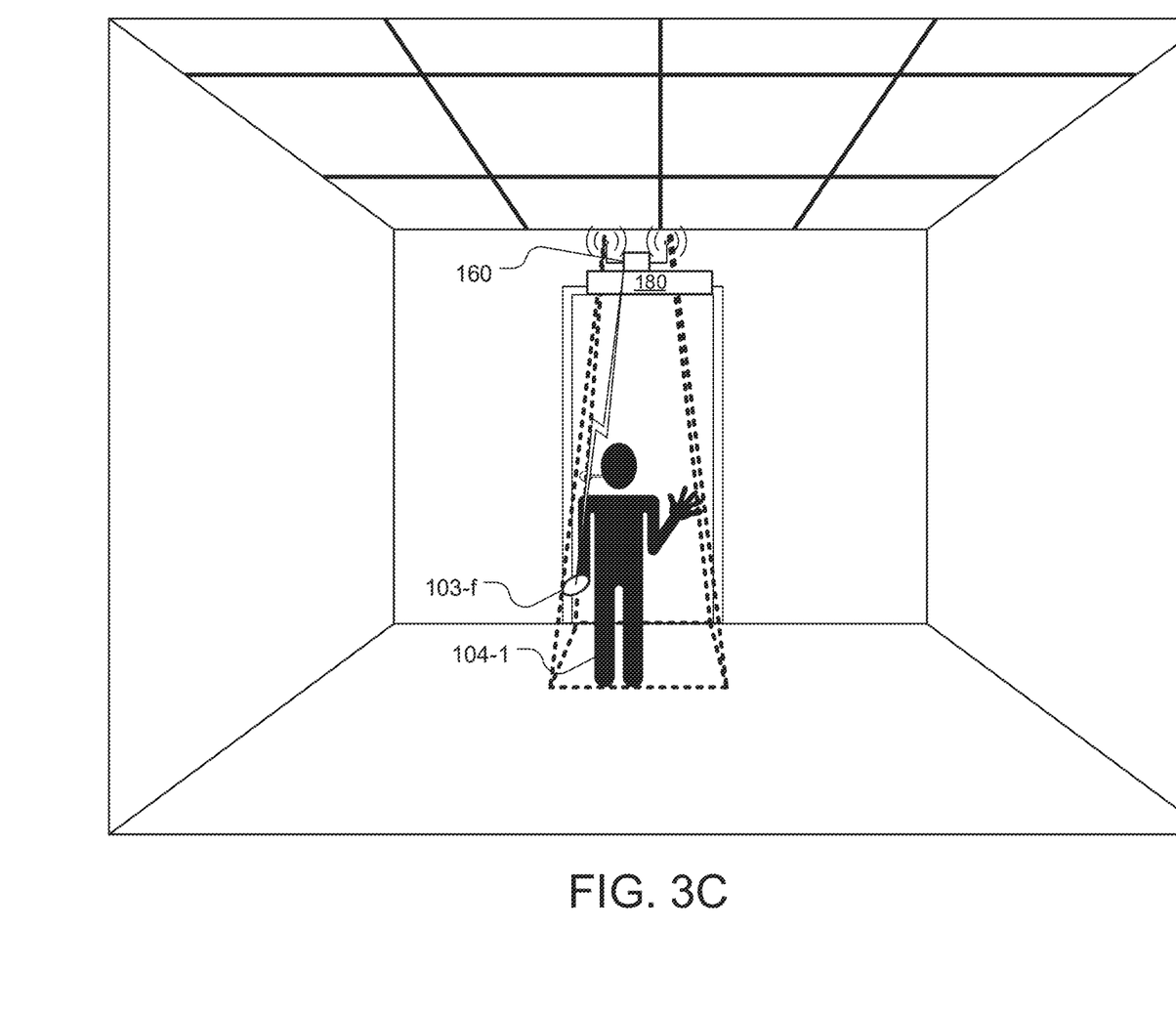
FIG. 3C is a perspective drawing illustrating an example of how the ranging camera of the access control system can be used for gesture recognition.

FIG. 3C is a perspective drawing illustrating an example of how the ranging camera 180 of the access control system 100 can be used for gesture recognition. In this example, the user 104-1 passes through the threshold making a hand gesture. The ranging camera 180 captures and sends a three dimensional image of the user 104-1 to the verification and tracking system 115, which determines that a hand gesture has been displayed. In one example, an alarm signal is generated, indicating unsafe conditions. In another example, lights or equipment in the secured area can be turned on.

Figure 4:
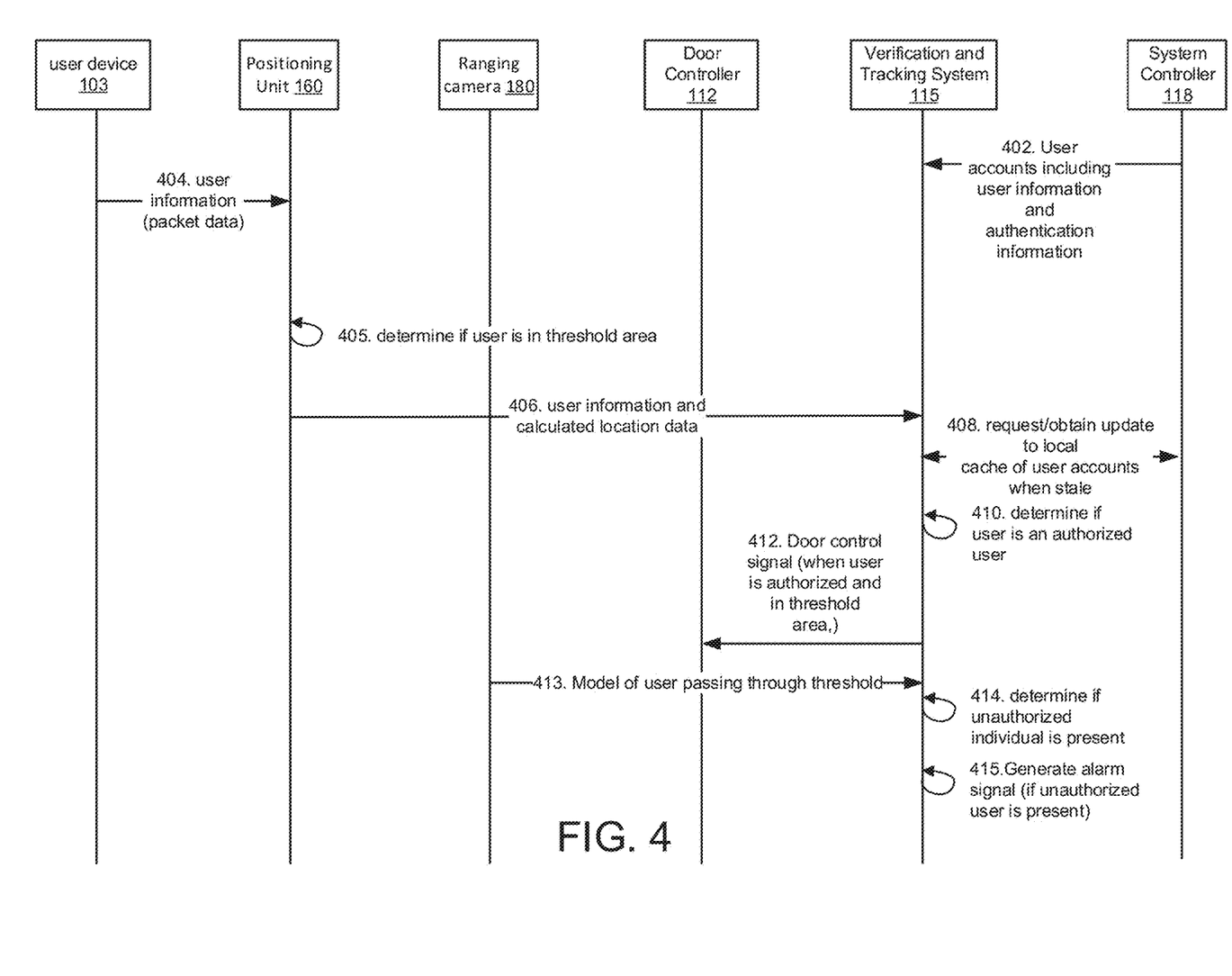
FIG. 4 is a sequence diagram illustrating the process by which the access control system uses the ranging camera to detect unauthorized users.

FIG. 4 is a sequence diagram illustrating the process by which the access control system 100 uses the ranging camera 180 to detect unauthorized users 104-T.

First, in step 402, user accounts including user information and authorization information are sent from the system controller 118 to the verification and tracking system 115 via the network 113.

In step 404 and generally on a continuous/periodic basis, the user device 103 broadcasts wireless signals including user information, and the positioning unit 160 detects the wireless signals and extracts the user information. Additionally, the positioning unit 160 calculates the location of the user device 103, and determines if the user device (and therefore if the user) is in the threshold area, in step 405. The user information and the location data are then sent to the verification and tracking system 115 for authentication in step 406.

According to step 408, the verification and tracking system 115 can request an update to its local cache of user accounts when stale. The information within the user accounts is stale if its time stamp indicates that it is older than a predetermined threshold value (e.g. one hour) as compared to the current time, in one example.

In step 410, the verification and tracking system 115 then determines if the user 104 is as authorized user for the access point. For this purpose, the verification and tracking system 115 first compares the user information forwarded from the positioning unit 110 to the stored user information within its local cache of user accounts. If required, the verification and tracking system 115 may confirm user status and account information with the system controller 118 if the users' information have not been previously sent to the verification and tracking system 115. Upon finding a match, the verification and tracking system 115 then executes a lookup of the matched user information against the locally stored authorization information in the cache for the user. If the authorization information 46 indicates that the user is allowed access to the access point near the positioning unit 160, the verification and tracking system 115 identifies the user 104 as an authorized user for the access point. In one implementation, this occurs when the matched user information is referenced within the authorization information.

In step 412, if the user is an authorized user, and the user's user device 103 was also determined to be within a threshold area 131, and if there are no unauthorized users present, then the verification and tracking system 115 sends a door control signal to the door controller 112 to enable access to the access point of the restricted area (e.g., unlock the door).

In step 413, a three dimensional model of the user 104 passing through the threshold is sent from the ranging camera 180 to the verification and tracking system 115.

In step 414, the verification and tracking system 115 then determines whether any unauthorized users 104-T are present by analyzing the model of the user passing through the threshold. In one example, it is determined how many users 104 are detected in the model, and the number of users 104 detected in the model is compared with the number of authorized users 104 detected within the proximity of the positioning unit 160. In this example, if there are less authorized users 104 detected within the proximity of the positioning unit 160 than there are users 104 detected in the model, it is determined that unauthorized users 104-T are present.

Finally, in step 415, if unauthorized users 104-T are detected, an alarm signal is generated by the verification and tracking system 115. In alternative embodiments, the alarm signal could prompt security personnel to investigate the secured area, cause an audible alarm tone to play in the secured area, or lock down surrounding access points for a predetermined period of time, among other examples.

Figure 5:
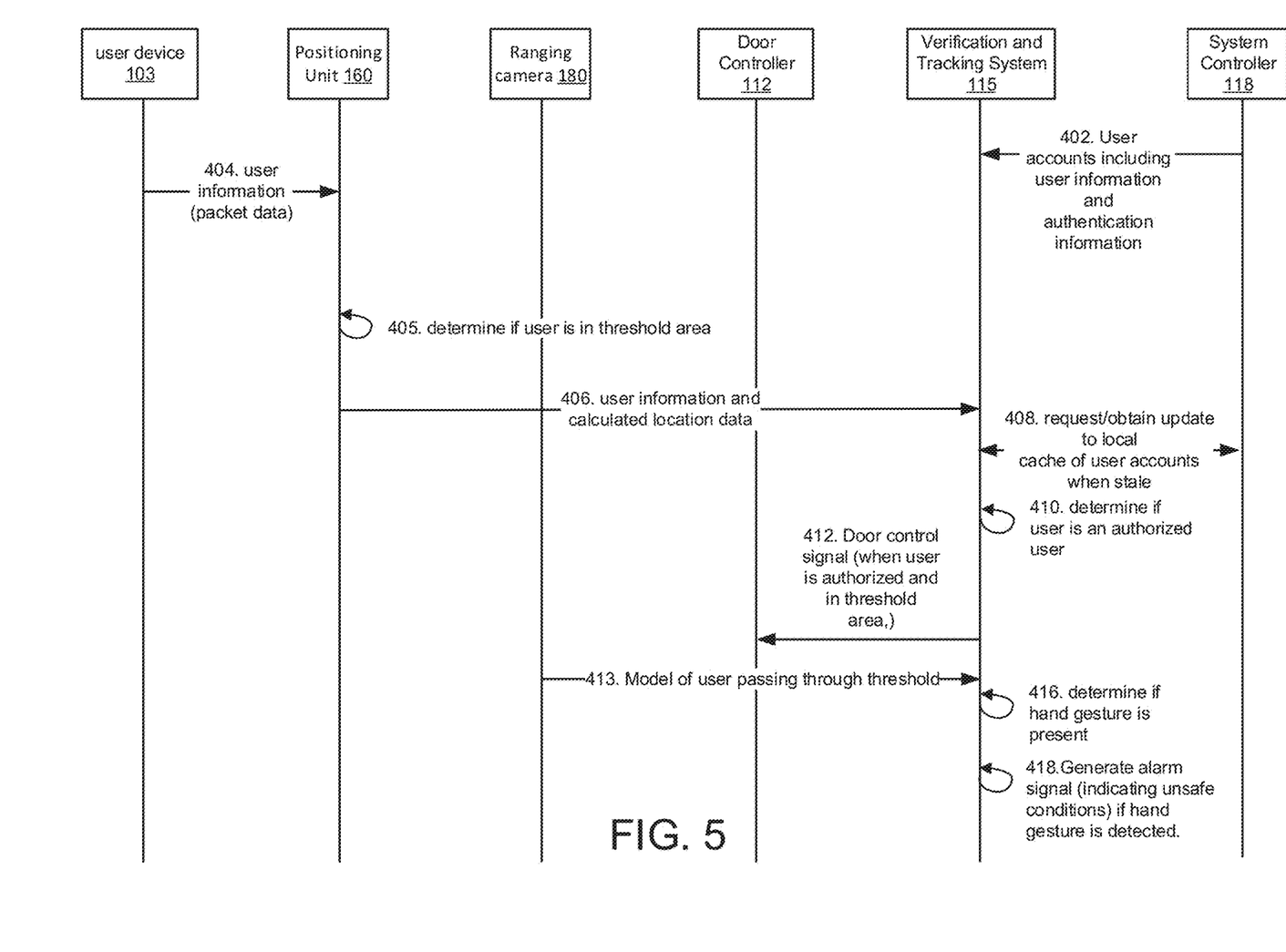
FIG. 5 is a sequence diagram illustrating the process by which the access control system uses the ranging camera for gesture recognition to indicate unsafe conditions.

FIG. 5 is a sequence diagram illustrating the process by which the access control system 100 uses the ranging camera 180 for gesture recognition to indicate unsafe conditions. Steps 402 through 413 proceed as previously described. Then, in step 416 the verification and tracking system 115 determines whether a hand gesture is detected in the model of the user 104 passing through the threshold. If a hand gesture is present, an alarm signal is generated in step 418 to indicate unsafe conditions.

Figure 6:
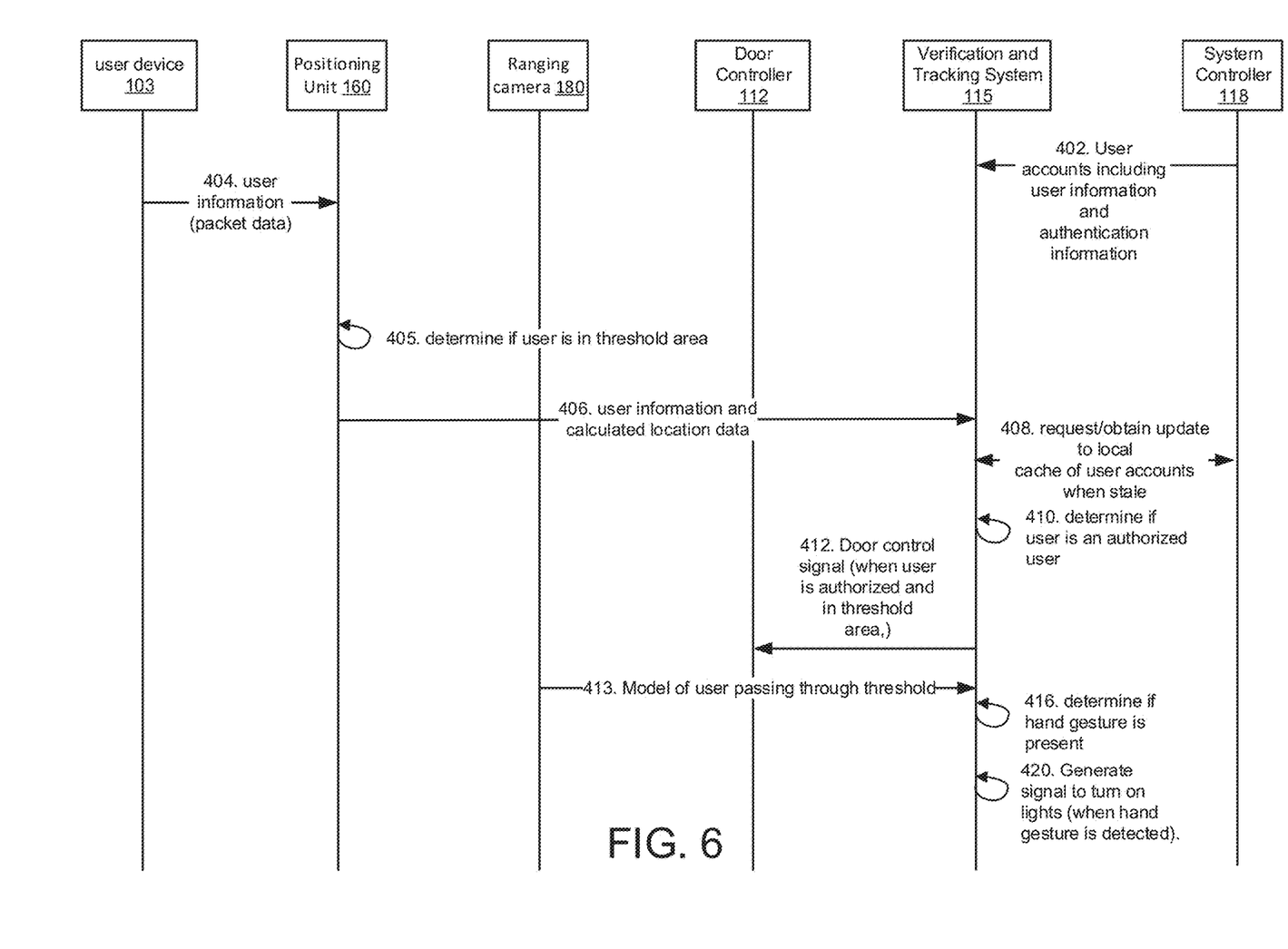
FIG. 6 is a sequence diagram illustrating the process by which the access control system uses the ranging camera for gesture recognition to turn on lights or equipment in the secured area.

FIG. 6 is a sequence diagram illustrating the process by which the access control system 100 uses the ranging camera 180 for gesture recognition to turn on lights or equipment in the secured area. Steps 402 through 416 proceed as previously described. If a hand gesture is present, a signal is generated in step 420 to turn on lights or equipment in the secured area.

While this invention has been particularly shown and described with references to preferred embodiments thereof, it will be understood by those skilled in the art that various changes in form and details may be made therein without departing from the scope of the invention encompassed by the appended claims.

What is claimed is:

1. An access control and user tracking system for a security system, the access control and user tracking system comprising:
    ranging camera units for generating three dimensional models of users passing through access points of the access control and user tracking system; and
    a verification and tracking system for analyzing the three dimensional models, wherein the verification and tracking system determines whether any unauthorized individuals are present by determining a quantity of people passing through the access point based on the three dimensional models and comparing the quantity of people passing through the access point to a quantity of authorized users detected in proximity to the access point, wherein each authorized user is detected based on user information transmitted by a mobile device associated with the authorized user.

2. The system as claimed in claim 1, wherein the ranging camera units comprise point range finding measurement sensor scanning cameras.

3. The system as claimed in claim 2, wherein the scanning cameras each comprise multiple sensors.

4. The system as claimed in claim 2, wherein the scanning cameras each comprise a single sensor that is spun in a circular motion and/or reflected with mirrors.

5. The system as claimed in claim 1, wherein the ranging camera units comprise structured light cameras.

6. The system as claimed in claim 1, wherein the ranging camera units comprise time of flight cameras.

7. The system as claimed in claim 1, wherein the ranging camera units are installed along the top of thresholds.

8. The system as claimed in claim 1, wherein the ranging camera units are installed in corners of thresholds.

9. The system as claimed in claim 1, wherein the verification and tracking system analyzes the three dimensional models to detect hand gestures of the users indicating unsafe conditions and/or to turn on lights and/or equipment.

10. The system as claimed in claim 1, wherein the ranging camera units generate the three dimensional models of the users passing through the access point by determining a distance between a top of a threshold of the access point and a surface of the user passing through the threshold.

11. The system as claimed in claim 10, wherein:
    the ranging camera units are point range finding measurement sensor scanning cameras that are installed in the top of the threshold facing toward a bottom of the threshold and/or outwards at an angle;
    one or more sensors of the point range finding measurement sensor scanning cameras gather data from numerous points across or directly in front of the threshold for every individual passing through the threshold, the gathered data including data representing distances at each sampling point from the top of the threshold to a surface of the individual passing through the threshold; and
    the three dimensional models are generated based on the data gathered by the one or more sensors.

12. The system as claimed in claim 1, wherein the verification tracking system detects the presence of unauthorized individuals based on whether the quantity of people passing through the access point is greater than a number of authorized users detected within proximity of a positioning unit of the access control and user tracking system.

13. The system as claimed in claim 12, wherein the positioning units receive packet data from user devices via one or more antennas of the positioning units and calculate location data for the user devices indicating ranges and/or directions of the user devices via one or more positioning techniques.

14. The system as claimed in claim 13, wherein the verification and tracking system accesses authorization information to determine whether the users of the user devices are authorized users, who are authorized to transit the access point.

15. The system as claimed in claim 1, wherein the verification and tracking system detects tailgating activity by detecting whether the unauthorized individuals are passing through the access point in close physical proximity to the authorized users based on the quantity of people determined to be passing through the access point and the three dimensional models.

16. The system as claimed in claim 1, wherein the verification and tracking system generates an alarm signal in response to detecting the presence of unauthorized individuals.

17. The system as claimed in claim 1, wherein the verification and tracking system sends a door control signal to a door controller to enable access to a restricted area in response to the user being an authorized user and if no unauthorized users are present.

18. A method for controlling access to access points of an access control and user tracking system for a security system, the method comprising:
    ranging camera units generating three dimensional models of users passing through the access points; and
    a verification and tracking system analyzing the three dimensional models, wherein the verification and tracking system determines whether any unauthorized individuals are present by determining a quantity of people passing through the access point based on the three dimensional models and comparing the quantity of people passing through the access point to a quantity of authorized users detected in proximity to the access point, wherein each authorized user is detected based on user information transmitted by a mobile device associated with the authorized user.

19. The method as claimed in claim 18, wherein the ranging camera units comprise point range finding measurement sensor scanning cameras.

20. The method as claimed in claim 19, wherein the scanning cameras each comprise multiple sensors.

21. The method as claimed in claim 19, wherein the scanning cameras each comprise a single sensor that is spun in a circular motion and/or reflected with mirrors.

22. The method as claimed in claim 18, wherein the ranging camera units comprise structured light cameras.

23. The method as claimed in claim 18, wherein the ranging camera units comprise time of flight cameras.

24. The method as claimed in claim 18, wherein the ranging camera units are installed along the top of thresholds.

25. The method as claimed in claim 18, wherein the ranging camera units are installed in corners of thresholds.

26. The method as claimed in claim 18, further comprising the verification and tracking system analyzing the three dimensional models to detect hand gestures of the users indicating unsafe conditions and/or to turn on lights and/or equipment.

* * * * *